US009288736B2

(12) United States Patent
Karaoguz

(10) Patent No.: US 9,288,736 B2
(45) Date of Patent: Mar. 15, 2016

(54) EFFICIENT NETWORK HAND-OFF UTILIZING STORED BEAM-FORMING INFORMATION

(71) Applicant: Broadcom Corporation, Irvine, CA (US)

(72) Inventor: Jeyhan Karaoguz, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 224 days.

(21) Appl. No.: 14/168,844

(22) Filed: Jan. 30, 2014

(65) Prior Publication Data

US 2014/0148173 A1 May 29, 2014

Related U.S. Application Data

(63) Continuation of application No. 12/020,869, filed on Jan. 28, 2008, now abandoned.

(60) Provisional application No. 60/887,471, filed on Jan. 31, 2007.

(51) Int. Cl.
*H04W 36/32* (2009.01)
*H04B 7/04* (2006.01)
*H04W 16/28* (2009.01)
*H04W 36/08* (2009.01)
*H04W 36/38* (2009.01)

(52) U.S. Cl.
CPC .............. *H04W 36/32* (2013.01); *H04B 7/0408* (2013.01); *H04W 16/28* (2013.01); *H04W 36/08* (2013.01); *H04W 36/38* (2013.01)

(58) Field of Classification Search
None
See application file for complete search history.

(56) References Cited

U.S. PATENT DOCUMENTS

| 6,108,538 | A | 8/2000 | Blasiak et al. |
| 6,697,644 | B2 | 2/2004 | Scherzer et al. |
| 6,721,567 | B1 | 4/2004 | Wang et al. |
| 2002/0187780 | A1 | 12/2002 | Souissi |
| 2004/0058678 | A1 | 3/2004 | deTorbal |
| 2005/0070285 | A1 | 3/2005 | Goransson |

(Continued)

FOREIGN PATENT DOCUMENTS

| DE | 10124397 | 11/2002 |
| WO | WO 0139524 | 5/2001 |
| WO | WO2006/105316 | 10/2006 |

OTHER PUBLICATIONS

EPO Communication dated Jun. 7, 2011 in Application No. 08001746.0-2412/1954091 (6 pages total).

*Primary Examiner* — Christine Duong
(74) *Attorney, Agent, or Firm* — Brinks Gilson & Lione

(57) ABSTRACT

A system and method for performing efficient network hand-off (e.g., of a mobile communication device) utilizing stored beam-forming information. For example and without limitation, before determining to perform a particular hand-off, various aspects may comprise storing beam-forming information associated with the particular hand-off. Various aspects may also, for example, comprise determining to perform the particular hand-off. Various aspects may additionally, for example, comprise (e.g., after determining to perform the particular hand-off) accessing the stored beam-forming information associated with the particular hand-off to be performed. Various aspects may further, for example, comprise utilizing the accessed beam-forming information to form a communication beam to utilize for performing the particular hand-off.

19 Claims, 8 Drawing Sheets

(56) References Cited

U.S. PATENT DOCUMENTS

2006/0229077 A1* 10/2006 Monk ............... H01Q 1/283
   455/442

2006/0276192 A1  12/2006  Dutta et al.
2007/0249402 A1  10/2007  Dong et al.
2008/0285524 A1  11/2008  Yokoyama

* cited by examiner

EFFICIENT NETWORK HAND-OFF UTILIZING STORED BEAM-FORMING INFORMATION

CROSS REFERENCE TO RELATED APPLICATIONS

This application is a continuation of U.S. patent application Ser. No. 12/020,869, filed Jan. 28, 2008, pending, and claims priority to provisional application Ser. No. 60/887,471, filed Jan. 31, 2007, which applications are incorporated herein by this reference in their entirety.

BACKGROUND

In a dynamic network environment, a communication system (e.g., a portable communication system) may move in and out of coverage areas associated with a plurality of different communication networks. Performing network hand-offs presents many challenges.

Further limitations and disadvantages of conventional and traditional approaches will become apparent to one of skill in the art, through comparison of such systems with the present invention as set forth in the remainder of the present application with reference to the drawings.

BRIEF SUMMARY

Various aspects of the present invention provide a system and method for performing efficient network hand-off utilizing beam-forming information, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION

Figure 1:
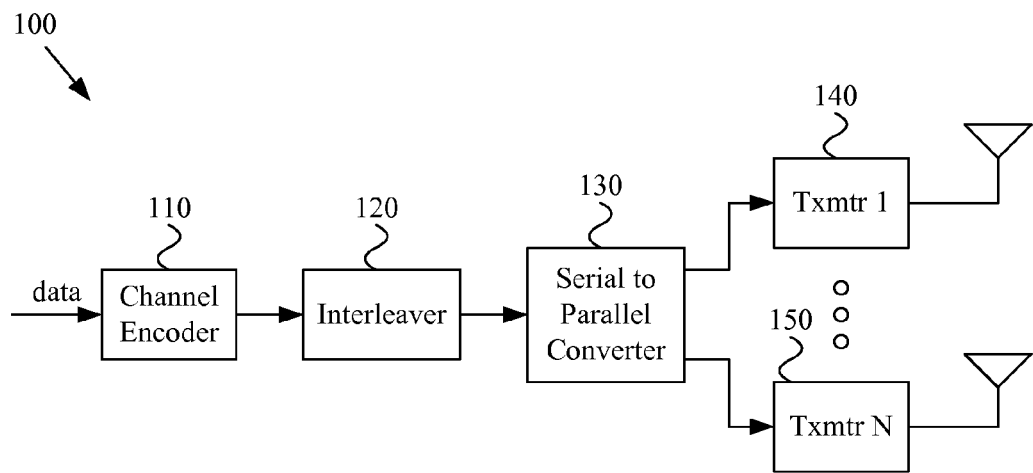
FIG. 1 is a diagram illustrating an exemplary MIMO transmitting configuration.
Figure 2:
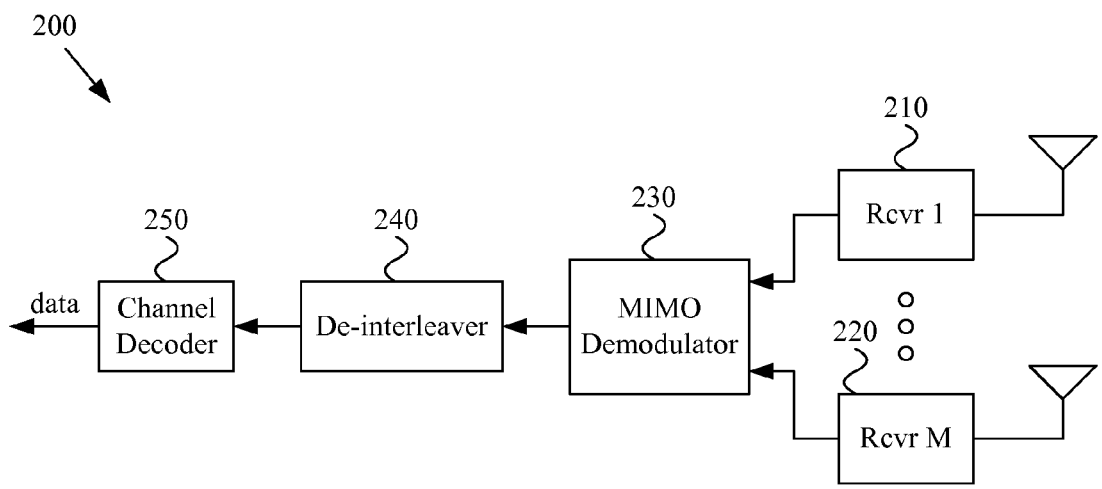
FIG. 2 is a diagram illustrating an exemplary MIMO receiving configuration.

The following discussion may illustrate various aspects of the present invention by referring to communication systems having Multiple-Input-Multiple-Output ("MIMO") communication capability. FIGS. 1 and 2 illustrate basic MIMO transmitting and receiving configurations, respectively. Note, however, that the scope of various aspects of the present invention should not be limited by particular characteristics of MIMO systems and/or of systems with both MIMO and beam-forming capability unless explicitly claimed as such.

The following discussion will refer to various communication modules, components or circuits. Such modules, components or circuits may generally comprise hardware, software or a combination thereof. Accordingly, the scope of various aspects of the present invention should not be limited by characteristics of particular hardware and/or software implementations of a module, component or circuit unless explicitly claimed as such. For example and without limitation, various aspects of the present invention may be implemented by a processor (e.g., a microprocessor, digital signal processor, baseband processor, microcontroller, etc.) executing software instructions (e.g., stored in volatile and/or non-volatile memory). Also for example, various aspects of the present invention may be implemented by an application-specific integrated circuit ("ASIC").

The following discussion will also refer to communication networks and various aspects thereof. For the following discussion, a communication network is generally the communication infrastructure through which a mobile communication device ("MCD") may communicate. For example and without limitation, a communication network may comprise a cellular communication network, a wireless metropolitan area network (WMAN), a wireless local area network (WLAN), a wireless personal area network (WPAN), etc. A particular communication network may, for example, generally have a corresponding communication protocol according to which a communication device (e.g., a MCD) may communicate with the communication network. Unless so claimed, the scope of various aspects of the present invention should not be limited by characteristics of a particular type of communication network.

FIG. 1 is a diagram illustrating an exemplary communication system 100 having a Multiple-Input-Multiple-Output ("MIMO") transmitting configuration. The channel encoder 110 receives data. The data may comprise any of a variety of data types, including but not limited to, audio data, video data, textual data, graphical data, pictorial data, numerical data, control data, etc. The channel encoder 110 may comprise any of a variety of encoder types. For example and without limitation, the channel encoder 110 may comprise characteristics of a conventional encoder, error correction encoder, MIMO encoder, etc.

The exemplary system 100 may comprise an interleaver 120 that receives the encoded data from the channel encoder 110. The interleaver 120 may, for example, perform interleaving to spread errors. The exemplary system 100 may comprise a serial-to-parallel converter 130 that divides the single data stream out of the interleaver 120 (or channel encoder 110) into a plurality of (e.g., up to N) parallel paths. The outputs of the serial-to-parallel converter 130 may be coupled to a plurality of transmitters (e.g., transmitter 140 through transmitter 150) and respective antennas for transmission.

FIG. 2 is a diagram illustrating an exemplary communication system 200 having an exemplary MIMO receiving configuration. A plurality of transmitted signals may arrive at the plurality of (e.g., up to M) antennas and respective receivers (e.g., receiver 210 through receiver 220). The receivers 210-220 may provide the simultaneously received signals to a MIMO demodulator 230. The MIMO demodulator 230 may provide a serial stream of information to a de-interleaver 240 and to a channel decoder 250 to convert the received signals into output data. As with the exemplary communication system 100 illustrated in FIG. 1, the data may comprise characteristics of any of a variety of types of data.

Note that the exemplary MIMO systems illustrated in FIGS. 1 and 2 are merely illustrative examples of MIMO systems. It should be noted that a MIMO system may comprise any of a variety of alternative configurations. Further, it should be noted that many characteristics of MIMO systems are shared with other multi-antenna systems (e.g., multi-antenna systems having beam-forming capability). Additionally, it should be noted that a MIMO configuration, beam-forming configuration or any multi-antenna configuration may be configured to utilize any one or more antennas for communication, either independently or in conjunction with each other.

Figure 3:
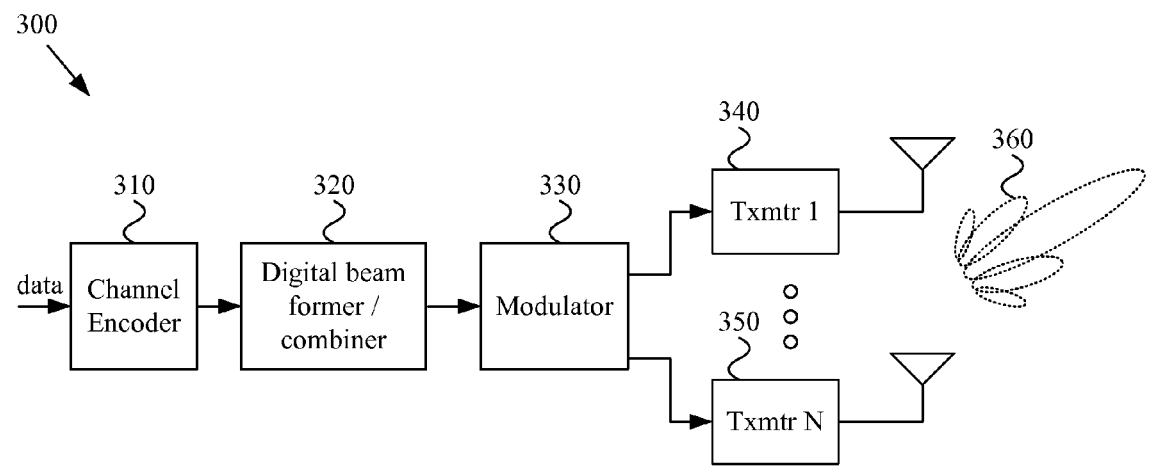
FIG. 3 is a diagram illustrating an exemplary communication system having a beam-forming configuration.

FIG. 3 is a diagram illustrating an exemplary communication system 300 having an exemplary beam-forming configuration. The channel encoder 310 receives data. The data may comprise any of a variety of data types, including but not limited to, audio data, video data, textual data, graphical data, pictorial data, numerical data, control data, etc. The channel encoder 310 may comprise any of a variety of encoder types. For example and without limitation, the channel encoder 310 may comprise characteristics of a conventional encoder, error correction encoder, etc.

The exemplary system 300 may comprise a beam former and/or combiner 320 (e.g., a digital beam-former and/or combiner) that receives the encoded data from the channel encoder 310. The beam former/combiner 320 may, for example, form parallel signals (e.g., N signals) that, when ultimately transmitted through corresponding transmitters and antennas, focus transmission energy in a particular direction (e.g., forming a directed transmission beam). The outputs of the beam former/combiner 320 may be modulated by a modulator 330 and communicated to a plurality of transmitters (e.g., transmitter 340 through transmitter 350) and respective antennas for transmission. As illustrated by the exemplary antenna gain pattern 360, the energy of the transmitted plurality of signals may constructively combine to focus composite transmission energy in a particular direction.

Analogously, the energy of a received plurality of signals may be constructively combined to focus reception energy from a particular direction (e.g., forming a directed reception beam). For example and without limitation, the transmitters 340-350 may be replaced by receivers and/or transceivers, the module 340 may be replaced with a demodulator, and the channel encoder 310 may be replaced with a decoder.

Beam-forming, in particular in real-time, may be an inefficient process (e.g., utilizing real-time trial and error, measurement, analysis and adjustment, etc.). For example, determining beam-forming parameters in real-time, when unnecessary, may be temporally inefficient and/or inefficient from a processing bandwidth and/or power consumption perspective. Additionally, performance may suffer due to latency related to the real-time beam-forming activities. Since particular hand-offs recur, various aspects of the present invention may utilize such recurrence to efficiently manage beam-forming related to such hand-offs.

As with the exemplary MIMO systems 100, 200 illustrated in FIGS. 1-2, the exemplary communication system 300 with beam-forming capability is merely exemplary. For example, a communication system utilizing beam-forming may be constructed in many alternative configurations. Accordingly, the scope of various aspects of the present invention should not be limited by characteristics of the exemplary communication system 300 illustrated in FIG. 3.

Aspects of the exemplary systems 100, 200 and 300 illustrated in FIGS. 1-3 may be combined in a single communication system. For example and without limitation, a communication system may comprise both MIMO and beam-forming capability (e.g., combining various aspects of the exemplary systems 100, 200 and 300.

The following discussion will, at times, refer to communication services. For the following discussion, a communication service generally corresponds to information being communicated to and/or from a communication device (e.g., an MCD) through a communication network. A particular communication service may, for example, correspond to a particular type of information being communicated to and/or from a communication device through a communication network. For example and without limitation, a communication service may correspond to a voice communication service, a music communication service, a multi-media communication service, a video communication service, an email communication service, a data communication service, a world-wide-web browsing communication service, an instant messaging communication service, etc. Various non-limiting examples of such communication services are provided herein. Unless so claimed, the scope of various aspects of the present invention should not be limited to characteristics of a particular type of communication service.

The following discussion may also refer to applications. Such applications may, for example, comprise software or firmware instructions that, when executed by a processor, perform various functions corresponding to communication services. In various examples, a particular dedicated application may correspond to a particular communication service (e.g., a music playing application or a VoIP application). In various other examples, a particular application may correspond to a plurality of communication services (e.g., a multi-media application capable of providing audio and/or video communication services), which may, for example, be selected by a user.

As non-limiting examples, a user may utilize a mobile communication device to provide a two-way voice communication service through a cellular telecommunication network (e.g., cellular telephony or data voice communication), a WLAN (e.g., Voice over IP or "VoIP"), a WMAN, a WWAN, a WPAN, etc. Also for example, a user may utilize a mobile communication device to provide a music communication service to the user (e.g., through audio data streaming) through a cellular network, a WLAN, a WMAN, a WPAN, etc. Further for example, a user may utilize a mobile communication device to provide a two-way multi-media communication service to the user through a cellular network, a WLAN, a WMAN, a WPAN, etc. Also for example, a user may utilize a mobile communication device to provide a video communication service to the user (e.g., through video data streaming) through a cellular network, a WLAN, a WMAN, a WPAN, etc.

Figure 4:
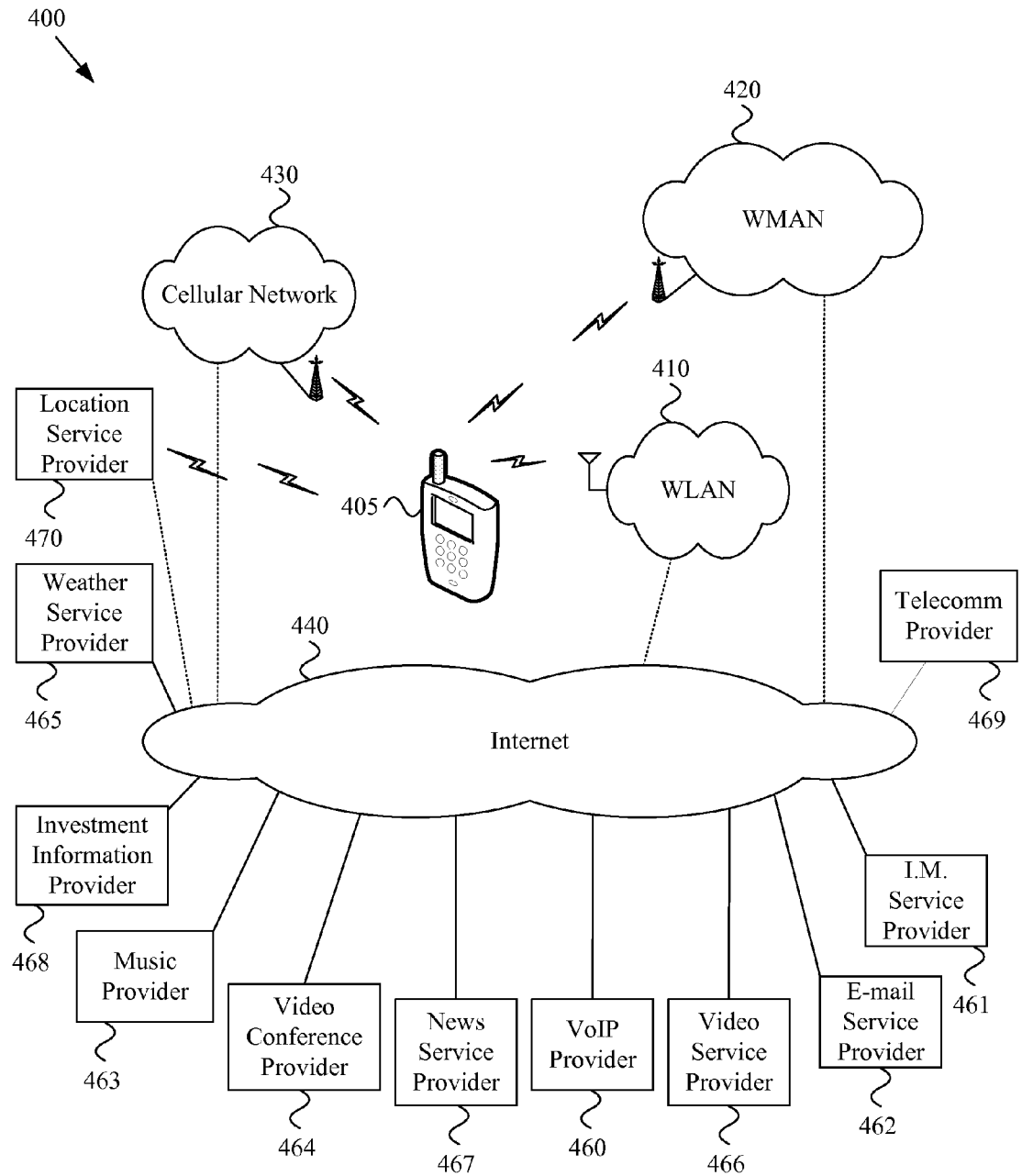
FIG. 4 is a block diagram illustrating an exemplary communication environment for a mobile communication device.

FIG. 4 is a block diagram illustrating an exemplary communication environment 400 for a mobile communication device. FIG. 4 illustrates that a user may utilize a mobile communication device 405 to provide user access to various communication services through various communication networks.

The mobile communication device 405, though illustrated with the form-factor of a cellular telephone, may comprise characteristics of any of a variety of mobile communication devices. For example and without limitation, the mobile communication device 405 may comprise characteristics of a cellular telephone, portable music player, portable video player, personal digital assistant, mobile email device, mobile web browsing device, handheld computer with communication capability, portable navigation system, mobile Internet gaming device, etc.

The mobile communication device 405 is illustrated in FIG. 4 with multiple (e.g., three) concurrent or serialized links to multiple respective communication networks. For example, the mobile communication device 405 may be capable of communicating with a Cellular Network 430 via an RF link, a WMAN 420 via an RF link, and a WLAN 410 via an RF link. Such links may, for example and without limitation, be maintained utilizing a plurality of communication stacks in the MCD 405.

The mobile communication device 405, though illustrated utilizing RF links to the WLAN 410, WMAN 420 and Cellular Network 430, may utilize communication links through any of a variety of communication media. For example and without limitation, the mobile communication device 405 may communicate utilizing wireless RF, non-tethered optical, tethered optical or wired links.

Each of the illustrated networks (e.g., the WLAN 410, WMAN 420 and Cellular Network 430) may be communicatively coupled to various other networks. In the non-limiting exemplary scenario illustrated in FIG. 4, each of the illustrated networks 410-430 is communicatively coupled to the Internet 440. For example, in a non-limiting exemplary scenario where a user is utilizing the mobile communication device 405 to provide streamed multi-media information to the user, the mobile communication device 405 may utilize any of the illustrated networks 410-430 and the Internet 440 to request and receive such streamed multi-media information from a provider of such information that is communicatively coupled to the Internet 440.

FIG. 4 illustrates a non-exclusive set of various communication service providers. For example and without limitation, a VoIP service provider 460, instant message service provider 461, email service provider 462, music service provider 463, video conferencing service provider 464, weather service provider 465, video and/or movie service provider 466, news service provider 467, investment information provider 468, telecommunication provider 469 and location service provider 470 (e.g., GPS) are illustrated communicatively coupled to the Internet 440, other networks and/or the MCD 405. Note that various communication service providers are not necessarily communicatively coupled to the Internet 440 and might be communicatively coupled only to other networks. For example, a music providing service (or any other communication service) might be communicatively coupled directly to the Cellular Network 430, WMAN 420 or WLAN 410 for more direct service. Also note that the exemplary location service provider 470 is communicatively coupled directly to the MCD 405 via an RF link.

FIG. 4 shows a block diagram illustrating an exemplary communication environment 400 for a mobile communication device 405. Various portions of FIG. 4 may be referred to directly or by inference in the following discussion. Note that the exemplary communication environment 400 is merely an exemplary illustration. Thus, various features of the exemplary communication environment 400 should not be utilized to limit the scope of various aspects of the present invention unless explicitly claimed.

Figure 5:
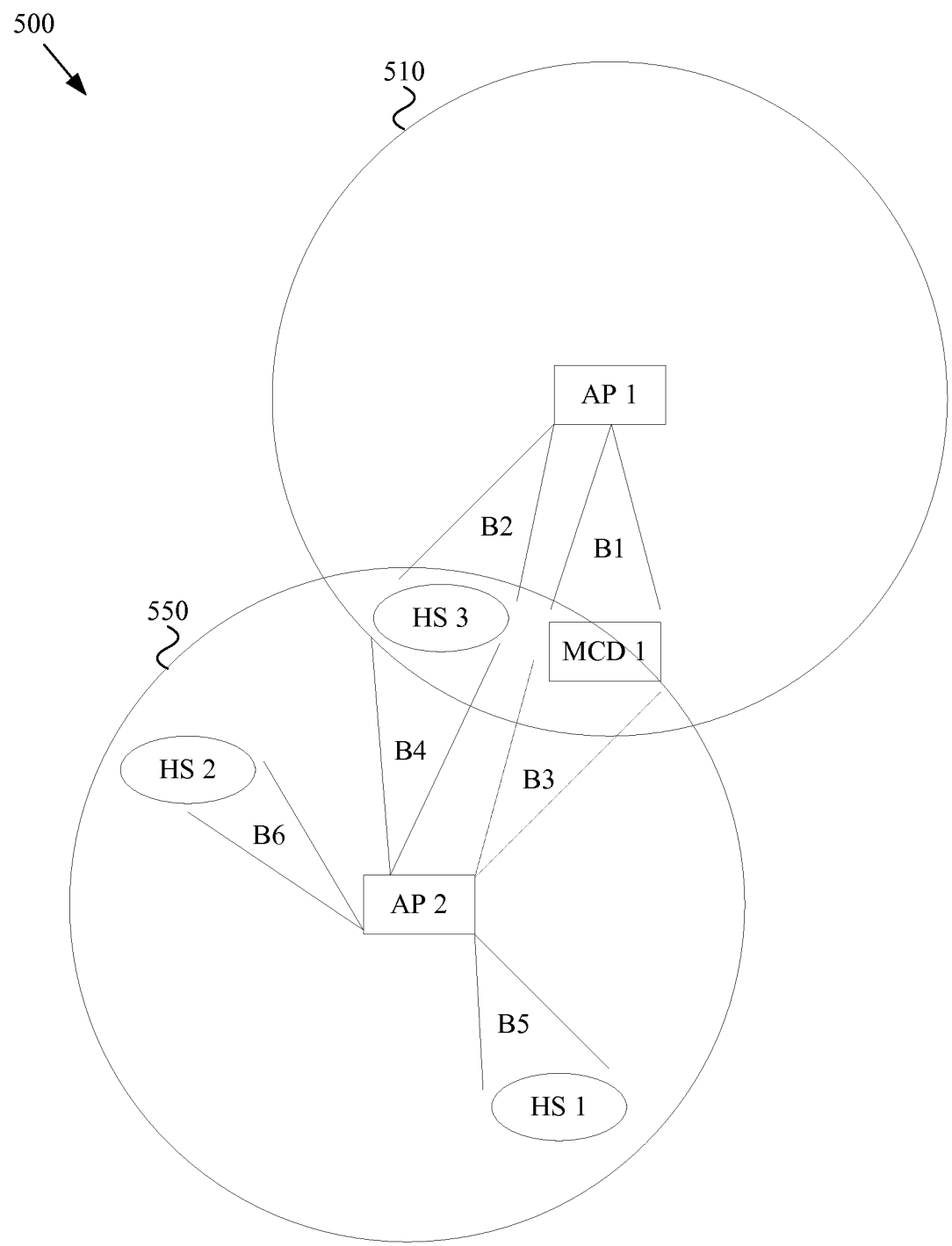
FIG. 5 is a block diagram illustrating an exemplary communication environment utilizing beam-forming for at least a portion of communications.

FIG. 5 is a block diagram illustrating an exemplary communication environment 500 utilizing beam-forming for at least a portion of communications. In the exemplary environment 500, a first access point AP1 is communicating in a first coverage zone 510 (or area), and a second access point AP2 is communicating in a second coverage zone 550. The first access point AP1 and the second access point AP2 may, for example and without limitation, be associated with different communication networks and/or different types of communication networks (e.g., telecommunication network, computer network, satellite communication network, terrestrial communication network, WLAN, WPAN, WMAN, WWAN, etc.).

The first access point AP1 is communicating with the first mobile communication device MCD1 utilizing a first formed beam B1 and with at least one other transceiver associated with a third hotspot HS3 utilizing at least a second beam B2. The second access point AP2 is communicating (or may be communicating in the future) with the first mobile communication device MCD1 utilizing a third formed beam B3 and with at least one transceiver associated with the third hotspot utilizing at least a fourth formed beam B4. The second access point AP2 is also communicating with at least one transceiver associated with a first hotspot HS1 utilizing at least a fifth formed beam B5 and with at least one transceiver associated with a second hotspot HS2 utilizing at least a sixth formed beam B6.

Note that though the exemplary communication environment 500 utilizes formed beams B1-B6, in various hand-off scenarios to be discussed later, various beams may be formed by beam-forming (e.g., utilizing formed beams directed between the access point and the MCD). Various antenna patterns may also, for example, be directional and static (e.g., static sector beams that may, for example, be found in cellular systems). Various antenna patterns may additionally, for example, be omni-directional, etc. In a non-limiting exemplary scenario, a mobile communication device MCD1 may be handed off from a first access point AP1 that uses beam-forming to communicate with the MCD to a second access point AP2 that uses beam-forming to communicate with the MCD. In another exemplary scenario, a mobile communication device MCD1 may be handed off from a first access point AP1 that uses an omni-directional antenna pattern to communicate with the mobile communication device MCD1 to a second access point AP2 that uses beam-forming to communicate with the mobile communication device MCD2. In yet another exemplary scenario, a mobile communication device MCD1 may be handed off from a first access point AP1 that uses a static directional antenna pattern (e.g., a pie-shaped sector pattern) to communicate with the mobile communication device MCD1 to a second access point AP2 that uses beam-forming to communicate with the mobile communication device MCD1 initially and then switches to an omni-directional antenna pattern and/or MIMO communication as the mobile communication device moves away from the fringes of the coverage area.

The exemplary communication environment 500 illustrates multiple exemplary hand-off scenarios. For example and without limitation, a hand-off of the first mobile communication device MCD1 may occur from the first access point AP1 to the second access point AP2. Also for example, a hand-off of a mobile communication device (not specifically shown) may occur from the third hotspot HS3 to either the first access point AP1 or the second access point AP2. Further for example, a hand-off of a mobile communication device (not specifically shown) may occur from the second hotspot HS2 or first hotspot HS1 to the second access point AP2. Any of such exemplary hand-offs may occur utilizing various aspects of the present invention, as described herein.

Figure 6:
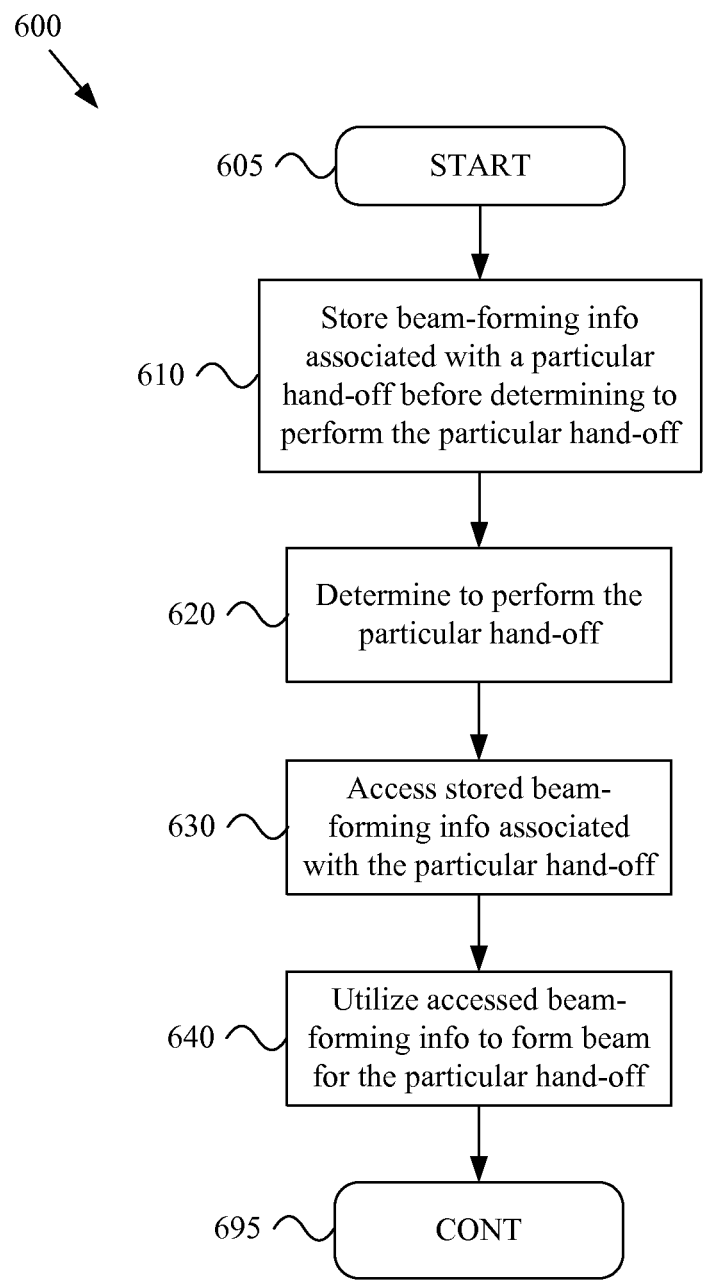
FIG. 6 is a flow diagram illustrating a method for efficient network hand-off, utilizing stored beam-forming information, in accordance with various aspects of the present invention.

Turning next to FIG. 6, such figure illustrates a method 600 for efficient network hand-off, utilizing stored beam-forming information, in accordance with various aspects of the present invention. The method 600 may, for example and without limitation, be utilized in association with any of the communication systems and/or communication environments and scenarios illustrated in FIGS. 1-5 and discussed previously.

The exemplary method 600 may begin executing at step 605. The exemplary method 600 may begin executing in response to any of a wide variety of causes or conditions. For example and without limitation, the exemplary method 600 may begin executing in response to a user or operator command. Also for example, the exemplary method 600 may begin executing in response to a detected condition (e.g., a condition detected in a communication environment). Additionally for example, the exemplary method 600 may begin executing in response to a start-up or reset condition. Further for example, the exemplary method 600 may begin executing in response to a communication beginning, occurring and/or ending. Still further for example, the exemplary method 600 may begin executing in response to a determination being made that a particular mobile communication device and/or a user thereof is associated with a particular type of communication service, quality of service and/or service plan. Accordingly, the scope of various aspects of the present invention should not be limited by characteristics of any particular initiating causes or conditions unless explicitly claimed.

The exemplary method 600 may, at step 610, comprise storing beam-forming information associated with a particular hand-off. Such storing may, for example, occur prior to a determination being made to perform the particular hand-off. For example, such storing may occur prior to a determination being made that the particular hand-off is imminent, going to occur relatively soon (e.g., during a present communication, during a particular time window, etc.), or going to occur in the relatively distant future. Such storing may also, for example, occur prior to a determination being made that the particular hand-off is probably going to occur or probably going to occur to a particular degree or threshold limit.

Step 610 may, for example, comprise storing the beam-forming information associated with a particular hand-off in apparatus of a communication network (e.g., at an access point, network controller, network database, etc.). In a non-limiting exemplary scenario, step 610 may comprise storing such beam-forming information for particularly common hand-off scenarios experienced by the access point (e.g., hand-offs with particular network access points, hotspots, mobile communication devices, etc.). Also for example, step 610 may comprise storing the beam-forming information at a central repository accessible by a plurality of different communication networks. Additionally for example, step 610 may comprise storing the beam-forming information at the mobile communication device. Then, for example, a mobile communication device may have beam-forming information stored therein that is associated with one or more hand-off scenarios commonly experienced by the mobile communication device. Further for example, step 610 may comprise storing such beam-forming information at the source and/or destination network for the hand-off. In a non-limiting exemplary scenario, step 610 may comprise storing such beam-forming information at a server associated with a particular wireless hotspot involved in the hand-off. Accordingly, the scope of various aspects of the present invention should not be limited by characteristics of a particular storage location for the beam-forming information, unless explicitly claimed.

The stored beam-forming information may, for example, comprise any of a variety of characteristics associated with forming a directed communication beam. For example and without limitation, the stored beam-forming information may comprise respective timing and/or phase information associated with a plurality of antennas and/or associated transmitters and/or receivers. Also for example, the stored beam-forming information may comprise beam direction information. Additionally for example, the stored beam-forming information may comprise information associated with latency, time, transmit power, antenna element identification, transmitter and/or receiver identification, etc. Accordingly, the scope of various aspects of the present invention should not be limited by characteristics of particular beam-forming information unless explicitly claimed.

Step 610 may comprise storing the beam-forming information associated with the particular hand-off in a manner such that the beam-forming information is accessible in any of a variety of manners. For example and without limitation, step 610 may comprise storing the beam-forming information in a manner that is accessible by hand-off location (e.g., exact location, approximate location, general area, coverage area, etc.). For example, step 610 may comprise storing the beam-forming information in a manner that is accessible by a relatively common hand-off location (e.g., a location of a particular wireless LAN or hotspot at which hand-offs are known to commonly occur, a location along a particular transportation route (e.g., automobile route, train route, pedestrian route, aircraft route, etc.) at which hand-offs are known to commonly occur, etc. In such a scenario, the beam-forming information may comprise information that may be utilized to direct a communication beam to the particular location.

Also for example, step 610 may comprise storing the beam-forming information in a manner that is accessible by network identification. For example, step 610 may comprise storing the beam-forming information in a manner that is accessible by the identification of a particular network (or access point thereof) involved in a commonly occurring hand-off (e.g., the destination and/or source network of the hand-off). In a non-limiting exemplary scenario, step 610 may comprise storing beam-forming information for forming a communication beam directed at a particular wireless hotspot with which hand-offs frequently occur. For example, the exemplary scenario may comprise a wireless MAN and/or telecommunication network access point commonly involved in hand-offs with a particular wireless hotspot (e.g., at an office place, coffee shop, restaurant, club, etc.). In such an exemplary scenario, step 610 may comprise storing beam-forming information associated with forming a communication beam directed at the location of the identified hotspot. Thus, such stored beam-forming information may be readily accessible by the identification of the particular hotspot.

Note that storing such beam-forming information in a manner accessible by location and/or network identification are merely examples. Such beam-forming information may be stored in a manner accessible by any of a variety of information types (e.g., accessible by communication network access point identity, mobile communication device identity, user identity, time, day, type-of-day, communication service identity, communication service plan identity, etc.).

Step 610 may comprise storing the beam-forming information in a manner accessible by location and/or network identification information in any of a variety of manners. For example and without limitation, step 610 may comprise storing the beam-forming information in a manner that is indexed by location and/or network identification information (e.g., in a table form, linked list form, database form, using metadata tags, etc.). In a non-limiting exemplary scenario, particular beam-forming information that has been found to result in communication beams that perform particularly well for hand-offs associated with a particular location and/or network and/or network access point may be stored in a manner that associates the particular location and/or network with the stored beam-forming information. Accordingly, the scope of various aspects of the present invention should not be limited by characteristics of any particular implementation of storing the beam-forming information in a manner accessible by location and/or network (or access point) identification unless explicitly claimed.

The exemplary method 600 may, at step 620, comprise determining to perform the particular communication hand-off. Step 620 may comprise determining to perform the particular communication hand-off in any of a variety of manners. For example and without limitation, step 620 may comprise determining to perform the particular communication hand-off based, at least in part, on signal and/or channel quality. Also for example, step 620 may comprise determining to perform the particular communication hand-off based, at least in part, on a request (e.g., a user request, operator request, etc.). Further for example, step 620 may comprise determining to perform the particular communication hand-off based, at least in part, on a hand-off profile associated with a particular user, communication network, communication service, etc. Accordingly, the scope of various aspects of the present invention should not be limited by characteristics of any particular manner of determining to perform a communication hand-off unless explicitly claimed.

In a non-limiting exemplary scenario, step 620 may comprise determining that a mobile communication device is entering and/or leaving the coverage area associated with a particular wireless LAN. Step 620 may make such a determination based, at least in part, on communication channel conditions between the MCD and the hotspot and/or based, at least in part, on communication channel conditions between another communication network access point and the MCD.

The exemplary method 600 may, at step 630, comprise accessing the stored beam-forming information (e.g., stored at step 610). For example and without limitation, step 630 may comprise accessing the stored beam-forming information after determining to perform a particular hand-off (e.g., as determined at step 620). For example, such a determination may result in initiation of hand-off activities. Also for example, step 630 may comprise accessing the stored beam-forming information after determining that performing a particular hand-off is imminent (i.e., going to occur) but before determining a hand-off time. Additionally for example, step 630 may comprise accessing the stored beam-forming information after determining that performing a particular hand-off is probably (e.g., statistically probable, likely, highly likely, etc.) going to occur but it is not definite that the hand-off is going to occur.

Step 630 may comprise accessing the stored beam-forming information in any of a variety of manners. For example and without limitation, step 630 may comprise accessing the stored beam-forming information based, at least in part, on location information, network and/or access point identity information, communication device identity, user identity information, time and/or day information, distance and/or direction information etc.

In a first non-limiting exemplary scenario, step 630 may comprise determining a location (e.g., an exact location, approximate location, general location, locale, region, coverage area, etc.) associated with the particular hand-off, and accessing the stored beam-forming information based, at least in part, on information of the determined location. Such a location may be determined in any of a variety of manners.

For example and without limitation, step 630 may comprise determining the location by receiving location information (e.g., at the mobile communication device and/or a communication network associated with the hand-off) from a positioning system (e.g., the Global Positioning System ("GPS")). Also for example, step 630 may comprise receiving positioning information from a communication network (e.g., from a server associated with a hotspot or a system performing triangulation). Further for example, step 630 may comprise retrieving location information from a memory (e.g., from a memory of the mobile communication device and/or communication network). Still further for example, step 630 may comprise determining a location associated with a known network (e.g., WLAN location, WPAN location, etc.). Also for example, step 630 may comprise determining a location associated with a particular communication network access point and/or coverage area (e.g., WMAN access point, cellular base station, etc.). Additionally for example, step 630 may comprise determining a location based, at least in part, on information input from a user of a communication device being handed off and/or an operator of a communication network. In yet another example, step 630 may comprise predicting a location associated with a particular hand-off (e.g., based on monitored behavior, travel patterns, hand-off patterns, interpolation, etc.). In still another example, step 630 may comprise determining location information utilizing UltraWideBand ("UWB") techniques. Accordingly, the scope of various aspects of the present invention should not be limited by characteristics of any particular manner of determining location unless explicitly claimed.

Location information may comprise characteristics of any of a variety of types of location information. For example and without limitation, the location information may comprise information of geographical coordinates (e.g., based on any of a number of geographical location systems), street addresses, landmarks, building identity and/or location, business identity and/or location, entertainment venue identity, intersections, transportation hub identity, etc. Note that such location information may also, for example, comprise location information corresponding to network location (e.g., hand-off source network and/or hand-off recipient network) and mobile communication device location. Accordingly, the scope of various aspects of the present invention should not be limited by characteristics of any particular type of location information unless explicitly claimed.

As mentioned previously, step 630 may comprise utilizing location information to access the stored beam-forming information. For example and without limitation, step 630 may comprise utilizing location information as an index (or one of a plurality of indices) to access particular stored beam-forming information. Also for example, step 630 may comprise utilizing location information as a database search criterion to search for particular stored beam-forming information. Further for example, step 630 may comprise utilizing location information as general search criteria for beam-forming information. Accordingly, the scope of various aspects of the present invention should not be limited by characteristics of any particular manner of utilizing location information to access beam-forming information, unless explicitly claimed.

In another non-limiting exemplary scenario, step 630 may comprise identifying a communication network (e.g., by name, by network address (e.g., IP address), by arbitrary tag, etc.) associated with the particular hand-off, and accessing the stored beam-forming information based, at least in part, on information of the network identity. Network identity may be determined in any of a variety of manners. For example and without limitation, step 630 may comprise determining network identity through direct communication with the network and/or through communication with a communication network associated with the network. Also for example, step 630 may comprise determining network identity through communication with a mobile communication device (e.g., the mobile communication device to be handed off to or from the network). Further for example, step 630 may comprise utilizing determined location information to ascertain network identity. Also for example, step 630 may comprise determining network identity based, at least in part, on transmissions from the network (e.g., beacons, typical data messages, control messages, synchronization signals, etc.). Accordingly, the scope of various aspects of the present invention should not be limited by characteristics of any particular manner of determining network identity.

As mentioned previously, step 630 may comprise utilizing network identity to access the stored beam-forming information. For example and without limitation, step 630 may comprise utilizing network identity information as an index (or one of a plurality of indices) to access particular stored beam-forming information. Also for example, step 630 may comprise utilizing network identity information as a database search criterion to search for particular stored beam-forming information. Further for example, step 630 may comprise utilizing network identity information as general search criteria for beam-forming information. Accordingly, the scope of various aspects of the present invention should not be limited by characteristics of any particular manner of utilizing network identity information to access beam-forming information, unless explicitly claimed.

In another non-limiting exemplary scenario, step 630 may comprise identifying an access point of a communication network (e.g., by name, by address (e.g., IP address), by arbitrary tag, etc.) associated with the particular hand-off, and accessing the stored beam-forming information based, at least in part, on information of the access point identity. Note that hand-offs may be performed between access points of a same communication network and/or between access points of different respective networks.

Access point identity may be determined in any of a variety of manners. For example and without limitation, step 630 may comprise determining access point identity through direction communication with the access point and/or through communication with a network controller or other apparatus of a communication network associated with the access point. Also for example, step 630 may comprise determining access point identity through communication with a mobile communication device (e.g., the mobile communication device to be handed off to or from the access point). Further for example, step 630 may comprise utilizing determined location information to ascertain access point identity. Also for example, step 630 may comprise determining access point identity based, at least in part, on transmissions from the access point (e.g., beacons, typical data messages, control messages, synchronization signals, etc.) or other access points associated therewith. Accordingly, the scope of various aspects of the present invention should not be limited by characteristics of any particular manner of determining access point identity.

As mentioned previously, step 630 may comprise utilizing access point identity to access the stored beam-forming information. For example and without limitation, step 630 may comprise utilizing access point identity information as an index (or one of a plurality of indices) to access particular stored beam-forming information. Also for example, step 630 may comprise utilizing access point identity information as a database search criterion to search for particular stored beam-forming information. Further for example, step 630 may comprise utilizing access point identity information as general search criteria for beam-forming information. Accordingly, the scope of various aspects of the present invention should not be limited by characteristics of any particular manner of utilizing access point identity information to access beam-forming information, unless explicitly claimed.

The previous examples present the determination and/or utilization of location, network identity and access point identity to access stored beam-forming information. Note that such examples are non-limiting illustrations and many other manners of accessing the stored beam-forming information, some of which were presented above, are contemplated. Additionally, any combination of the various manners is contemplated. For example and without limitation, any combination of location, network identity, access point identity, mobile communication device identity, user identity, time information, day information, service type, service availability, service plan provisions, etc., may be utilized to access stored beam-forming information.

The exemplary method 600 may, at step 640, comprise utilizing the accessed beam-forming information (e.g., accessed at step 630) to form a communication beam to utilize for performing the particular hand-off. For example and without limitation, step 640 may comprise utilizing the accessed beam-forming information to form a communication beam prior to determining when to perform the particular hand-off. Also for example, step 640 may comprise utilizing the accessed beam-forming information to form a communication beam prior to triggering the particular hand-off. In another example, step 640 may comprise utilizing the accessed beam-forming information to form a communication beam prior to determining when the particular hand-off is imminent (e.g., based on a degree of likelihood, for example, statistically based degree of likelihood).

Note that step 640 may comprise utilizing the formed communication beam to perform a hand-off (e.g., of a mobile communication device) in any of a variety of manners. For example and without limitation, step 640 may comprise forming the communication beam and utilizing the formed communication beam at the source network (or access point) of the hand-off and/or the recipient network (or access point). For example, not all networks involved in the hand-off need utilize beam forming. Also for example, as discussed previously with regard to FIG. 5, a hand-off may be performed between access points of a same communication network, between different communication networks of the same type and/or between different types of communication networks.

The exemplary method 600 may, at step 695 comprise performing continued processing. Such continued processing may comprise performing any of a variety of communication activities, non-limiting examples of which are provided below.

For example and without limitation, step 695 may comprise adapting the stored beam-forming information. In a non-limiting exemplary scenario, the communication system(s) implementing the exemplary method 600 may determine that the accessed (e.g., at step 630) stored (e.g., at step 610) beam-forming information should be modified. Such a determination may, for example, be based on changing communication environment, etc. In such a scenario, step 695 may comprise determining adjustments to make to the accessed beam-forming information and/or determining new beam-forming information. Such adapted beam-forming information may then be stored (e.g., in a manner similar to that discussed previously with regard to step 610).

Also for example, step 695 may comprise switching from communicating with a handed-off mobile communication device using beam-forming to communicating with the handed-off mobile communication device utilizing single antenna communication, Single-Input-Single-Output ("SISO") communication, MIMO communication, Multiple-Input-Single-Output ("MISO") communication, etc. As discussed previously, a communication device (e.g., an access point and/or mobile communication device) may comprise various characteristics of the exemplary systems 100, 200 and 300 illustrated in FIGS. 1-3. Thus, such systems may switch between various forms of communicating utilizing one or more antennas and/or associated transceivers.

Further for example, step 695 (or a portion of step 640) may comprise handing off one or more communication services being provided to the communication device handed off. In a non-limiting exemplary scenario, prior to performing a hand-off, the source communication network may be providing a communication service to the mobile communication device (and/or a user thereof). In the exemplary scenario, the formed communication beam may be utilized to hand off the mobile communication device from the source communication network to a destination communication network. Continuing the exemplary scenario, the destination communication network may then continue providing the communication service to the mobile communication device. Many non-limiting examples of such a communication service were provided previously. Note that in such an exemplary scenario, the communication service may be one of a plurality of communication services presently being provided to the mobile communication device by respective communication networks. All or only a portion of such communication services might be handed off.

In general, FIG. 6 illustrates a method 600 for efficient network hand-off, utilizing stored beam-forming information. The following discussion of FIGS. 7 and 8 will provide non-limiting examples of other aspects that may be implemented independently of various steps of the exemplary method 600 illustrated in FIG. 6 and/or in conjunction with various steps of the exemplary method 600 illustrated in FIG. 6.

Figure 7:
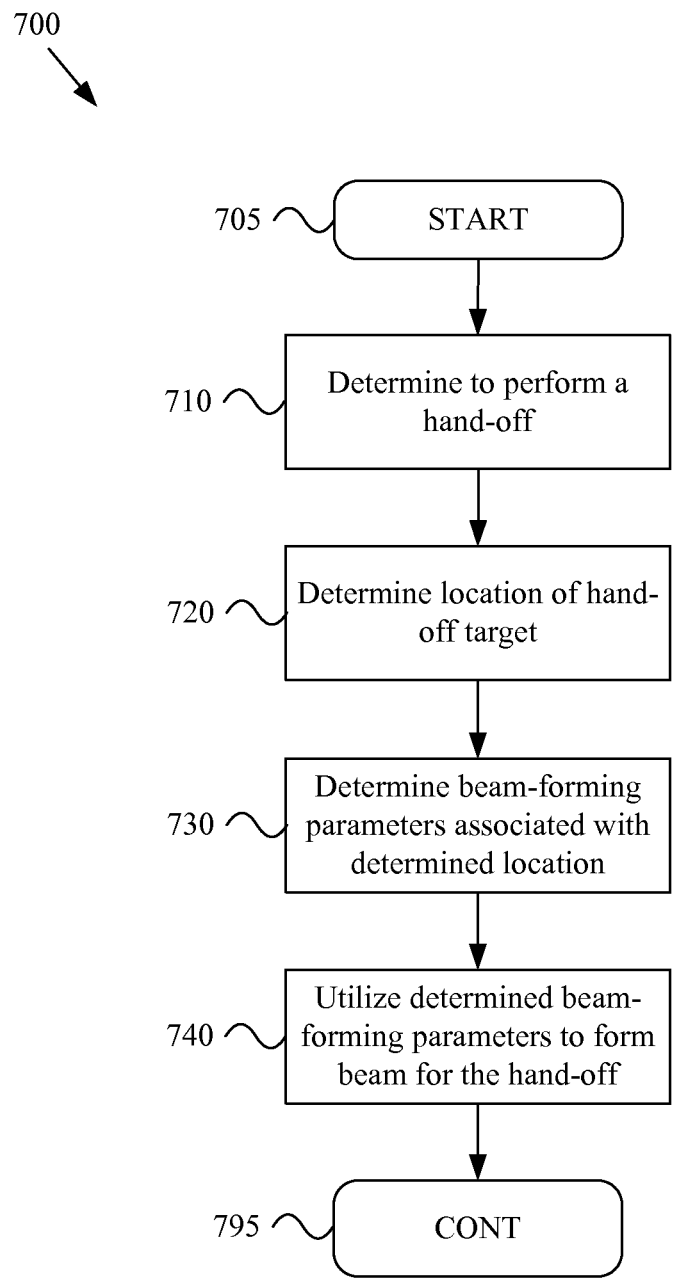
FIG. 7 is a flow diagram illustrating a method for efficient network hand-off, associating location information with beam-forming information, in accordance with various aspects of the present invention.

Turning next to FIG. 7, such figure is a flow diagram illustrating a method 700 for efficient network hand-off, associating location information with beam-forming information, in accordance with various aspects of the present invention. The exemplary method 700 may, for example and without limitation, share any or all characteristics with the exemplary method 600 illustrated in FIG. 6 and discussed previously. Additionally, the exemplary method 700 may be implemented by a communication system sharing any or all characteristics with the exemplary communication systems 100, 200 and 300 illustrated in FIGS. 1-3 and discussed previously. Further, the exemplary method 700 may be implemented in a communication environment sharing any or all characteristics with the exemplary environments 400 and 500 illustrated in FIGS. 4-5 and discussed previously.

The exemplary method 700 may begin executing at step 705. The exemplary method 700 may begin executing in response to any of a wide variety of causes or conditions. For example and without limitation, the exemplary method 700 may begin executing in response to a user or operator command. Also for example, the exemplary method 700 may begin executing in response to a detected condition (e.g., a condition detected in a communication environment). Additionally for example, the exemplary method 700 may begin executing in response to a start-up or reset condition. Further for example, the exemplary method 700 may begin executing in response to a communication beginning, occurring and/or ending. Still further for example, the exemplary method 700 may begin executing in response to a determination being made that a particular mobile communication device and/or a user thereof is associated with a particular type of communication service, quality of service and/or service plan. Additionally, the exemplary method 700 may begin executing in response to a determination that a hand-off is imminent, likely, probably, highly likely, etc. Accordingly, the scope of various aspects of the present invention should not be limited by characteristics of any particular initiating causes or conditions unless explicitly claimed.

The exemplary method 700 may, at step 710, comprise determining to perform a hand-off. Step 710 may, for example and without limitation, share any or all characteristics with step 620 of the exemplary method 600 illustrated in FIG. 6 and discussed previously.

The exemplary method 700 may, at step 720, comprise determining a location of (or associated with) a hand-off target (e.g., a mobile communication device to be handed off). Step 720 may comprise determining the location of the hand-off target in any of a variety of manners. For example and without limitation, step 720 may share any or all characteristics with step 630 of the exemplary method 600 illustrated in FIG. 6 and discussed previously.

In a first non-limiting exemplary scenario, step 720 may comprise determining a location (e.g., an exact location, approximate location, general location, locale, region, coverage area, etc.) associated with the particular hand-off (e.g., a location of a mobile communication device being handed off). Such a location may be determined in any of a variety of manners. For example and without limitation, step 720 may comprise determining the location by receiving location information (e.g., at the mobile communication device being handed off and/or a communication network associated with the hand-off) from a positioning system (e.g., the Global Positioning System). Also for example, step 720 may comprise receiving positioning information from a communication network (e.g., from a server associated with a hotspot or a system performing triangulation). Further for example, step 720 may comprise retrieving location information from a memory (e.g., from a memory of the mobile communication device being handed off and/or a memory of (or accessible by) communication network). Still further for example, step 720 may comprise determining a location associated with a known network (e.g., WLAN location, WPAN location, etc. that may be in communication with the mobile communication device before being handed off or that will be in communication with the mobile communication device after being handed off). Also for example, step 720 may comprise determining a location associated with a particular communication network access point and/or coverage area (e.g., WMAN access point, cellular base station, etc. that is in communication with the mobile communication device before being handed off or that will be in communication with the mobile communication device after hand-off). Additionally for example, step 720 may comprise determining a location based, at least in part, on information input from a user of a mobile communication device being handed off and/or an operator of a communication network. In yet another example, step 720 may comprise predicting (e.g., interpolating) a location of a mobile communication device associated with a particular hand-off (e.g., based on monitored behavior, travel patterns, hand-off patterns, etc.). Accordingly, the scope of various aspects of the present invention should not be limited by characteristics of any particular manner of determining location unless explicitly claimed.

As discussed previously, location information associated with the determined location may comprise characteristics of any of a variety of types of location information. For example and without limitation, the location information may comprise information of geographical coordinates (e.g., based on any of a number of geographical location systems), street addresses, landmarks, building identity and/or location, business identity and/or location, entertainment venue identity, intersections, transportation hub identity, etc. Note that such location information may also, for example, comprise location information corresponding to network location (e.g., hand-off source network and/or hand-off recipient network) and/or mobile communication device location. Accordingly, the scope of various aspects of the present invention should not be limited by characteristics of any particular type of location information unless explicitly claimed.

The exemplary method 700 may, at step 730, comprise determining beam-forming parameters associated with the hand-off location (e.g., as determined at step 720). Step 730 may comprise determining the beam-forming parameters in any of a variety of manners. For example and without limitation, step 730 may comprise accessing stored beam-forming parameters associated with the determined location. Non-limiting examples of such access were discussed previously with regard to step 630 of the exemplary method 600 illustrated in FIG. 6.

Also for example, step 730 may comprise calculating the beam-forming parameters as a function of the determined location (e.g., as a function of a beam direction associated with the determined location). For example, step 730 may comprise determining timing and/or phase relationships corresponding to various antennas and/or transmitters and/or receivers for directing a beam of a particular shape to the determined location. Also for example, step 730 may comprise determining beam-forming parameters as a combination of accessed stored beam-forming information and calculated adjustments to such accessed stored information. Accordingly, the scope of various aspects of the present invention should not be limited by characteristics of any particular manner of determining beam-forming parameters associated with a determined location unless explicitly claimed.

The exemplary method 700 may, at step 740, comprise utilizing determined beam-forming parameters (e.g., as determined at step 730) to form a communication beam (e.g., a transmission and/or reception beam) to utilize in performing the hand-off. Step 740 may, for example and without limitation, share any or all characteristics with step 640 of the exemplary method 600 illustrated in FIG. 6 and discussed previously.

The exemplary method 700 may, at step 795, comprise continuing to perform additional communication activities. For example and without limitation, step 795 may share any or all characteristics with step 695 of the exemplary method 600 illustrated in FIG. 6 and discussed previously.

Figure 8:
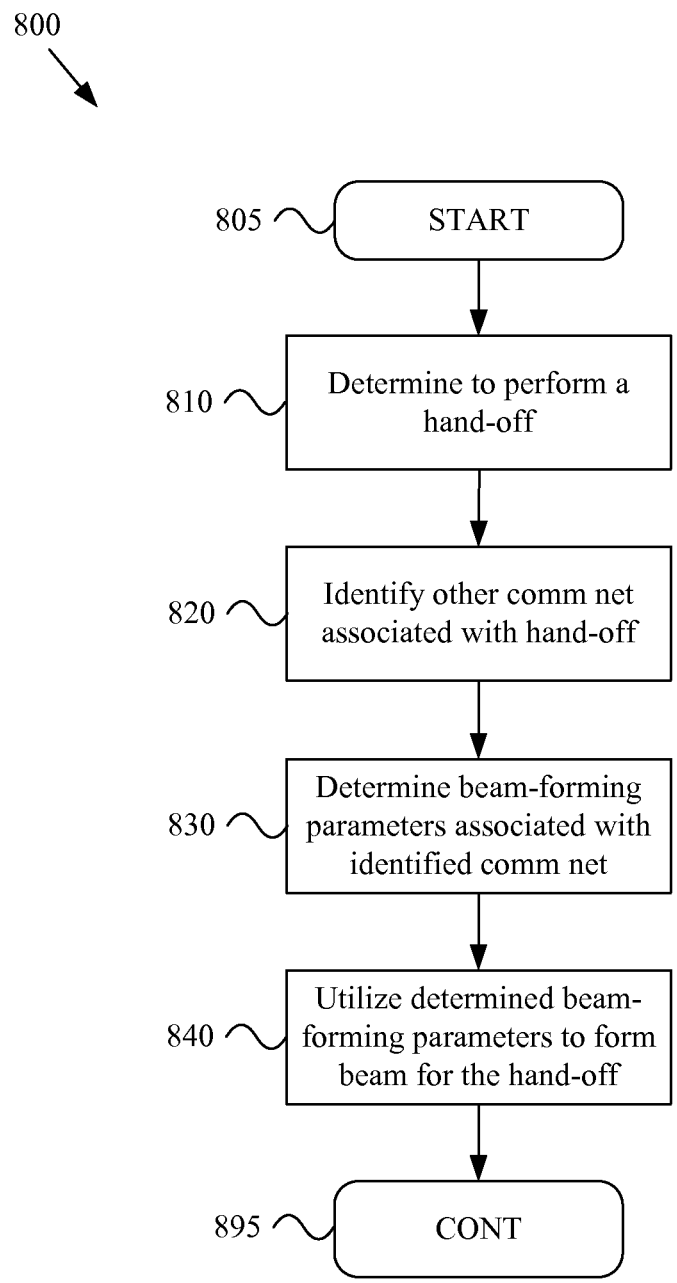
FIG. 8 is a flow diagram illustrating a method for efficient network hand-off, associating network identification with beam-forming information, in accordance with various aspects of the present invention.

Turning next to FIG. 8, such figure is a flow diagram illustrating a method 800 for efficient network hand-off, associating network identification with beam-forming information, in accordance with various aspects of the present invention. The exemplary method 800 may, for example and without limitation, share any or all characteristics with the exemplary methods 600 and 700 illustrated in FIGS. 6-7 and discussed previously. Additionally, the exemplary method 800 may be implemented by a communication system sharing any or all characteristics with the exemplary communication systems 100, 200 and 300 illustrated in FIGS. 1-3 and discussed previously. Further, the exemplary method 800 may be implemented in a communication environment sharing any or all characteristics with the exemplary environments 400 and 500 illustrated in FIGS. 4-5 and discussed previously.

The exemplary method 800 may begin executing at step 805. The exemplary method 800 may begin executing in response to any of a wide variety of causes or conditions. For example and without limitation, step 805 may share any or all characteristics with steps 605 and 705 of the exemplary methods 600 and 700 illustrated in FIGS. 6-7 and discussed previously.

The exemplary method 800 may, at step 810, comprise determining to perform a hand-off. Step 810 may, for example and without limitation, share any or all characteristics with steps 620 and 710 of the exemplary methods 600 and 700 illustrated in FIGS. 6-7 and discussed previously.

The exemplary method 800 may, at step 820, comprise identifying one or more communication networks (or access points) associated with the hand-off (e.g., a communication network sourcing and/or receiving a mobile communication device hand-off). Step 820 may comprise determining the location of the hand-off target in any of a variety of manners. For example and without limitation, step 820 may share any or all characteristics with step 630 of the exemplary method 600 illustrated in FIG. 6 and discussed previously.

For example and without limitation, step 820 may comprise determining network identity through direct communication with the network and/or through communication with a communication network associated with the network. Also for example, step 820 may comprise determining network identity through communication with a mobile communication device (e.g., the mobile communication device to be handed off to or from the network). Further for example, step 820 may comprise utilizing determined location information to ascertain network identity. Also for example, step 820 may comprise determining network identity based, at least in part, on transmissions from the network (e.g., beacons, typical data messages, control messages, synchronization signals, etc.). Accordingly, the scope of various aspects of the present invention should not be limited by characteristics of any particular manner of determining network identity.

The exemplary method 800 may, at step 830, comprise determining beam-forming parameters associated with one or more identified communication networks (e.g., identified at step 820). Step 830 may, for example and without limitation, share any or all characteristics with steps 620 and 730 illustrated in FIGS. 6-7 and discussed previously.

Step 830 may comprise determining the beam-forming parameters in any of a variety of manners. For example and without limitation, step 830 may comprise accessing stored beam-forming parameters associated with the identified communication network(s). Non-limiting examples of such access were discussed previously with regard to step 630 of the exemplary method 600 illustrated in FIG. 6.

Also for example, step 830 may comprise calculating the beam-forming parameters as a function of the identified communication network(s) (e.g., as a function of a beam direction associated with the identified communication network(s)). For example, step 830 may comprise determining timing and/or phase relationships corresponding to various antennas and/or transmitters and/or receivers for directing a beam of a particular shape to the identified communication network(s). Also for example, step 830 may comprise determining beam-forming parameters as a combination of accessed stored beam-forming information and calculated adjustments to such accessed stored information. Accordingly, the scope of various aspects of the present invention should not be limited by characteristics of any particular manner of determining beam-forming parameters associated with one or more identified communication networks unless explicitly claimed.

The exemplary method 800 may, at step 840, comprise utilizing determined beam-forming parameters (e.g., as determined at step 830) to form a communication beam (e.g., a transmission and/or reception beam) to utilize in performing the hand-off. Step 840 may, for example and without limitation, share any or all characteristics with steps 640 and 740 of the exemplary methods 600 and 700 illustrated in FIGS. 6-7 and discussed previously.

The exemplary method 800 may, at step 895, comprise continuing to perform additional communication activities. For example and without limitation, step 895 may share any or all characteristics with step 695 of the exemplary method 600 illustrated in FIG. 6 and discussed previously.

Figure 9:
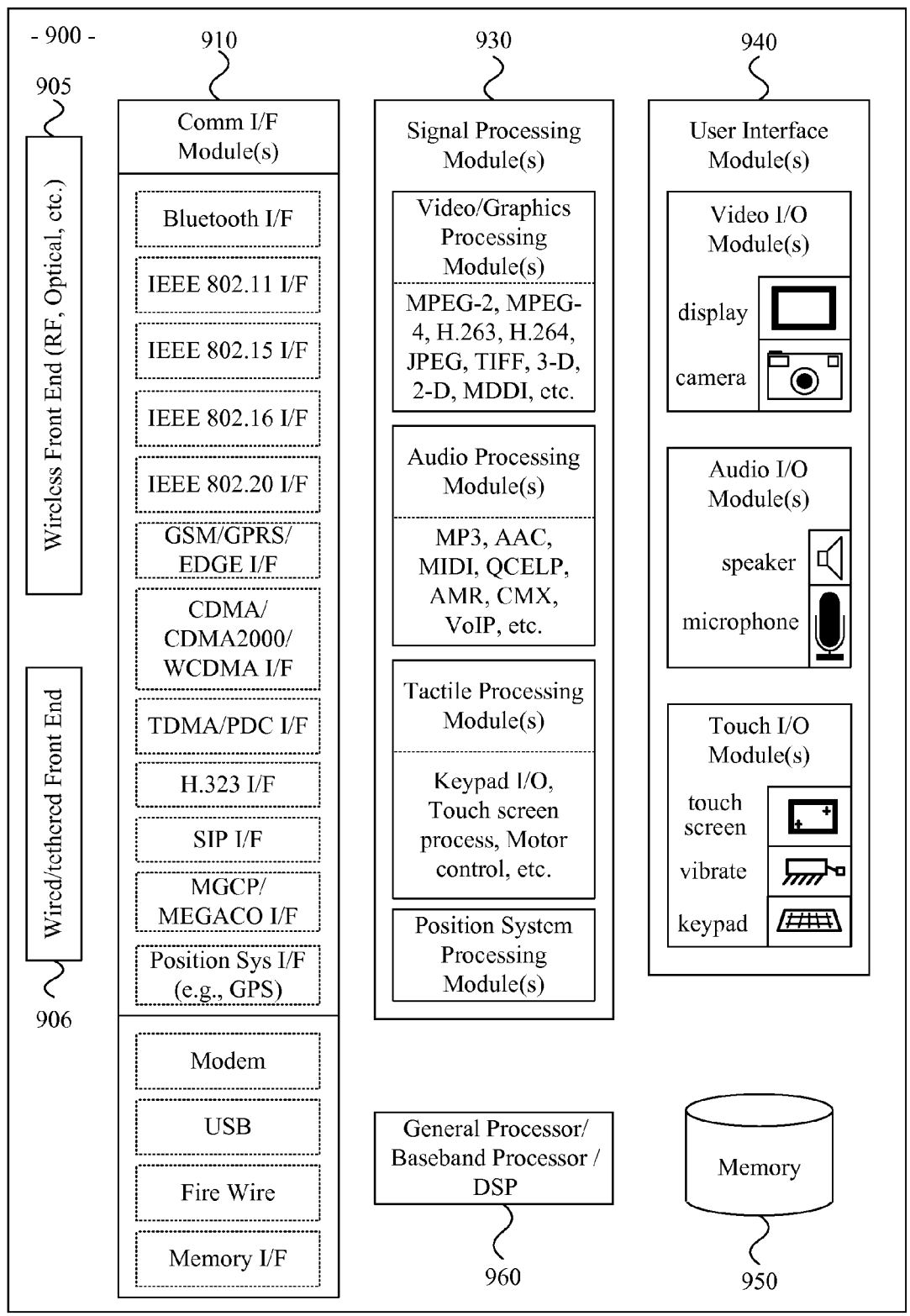
FIG. 9 is a diagram illustrating a non-limiting exemplary block diagram of a communication device implementing various aspects of the present invention.

Turning next to FIG. 9, such figure is a diagram illustrating a non-limiting exemplary block diagram of a communication device 900 that operates to perform efficient network hand-off utilizing beam forming in accordance with various aspects of the present invention. The communication device 900 may, for example, be a mobile communication device, a network access point or base station, a network controller or other network infrastructure component or subsystem, an integrated circuit, an insertible communication module, etc. The communication device 900 may, for example, share any or all characteristics with the exemplary communication systems 100, 200 and 300 illustrated in FIGS. 1-3 and discussed previously. Also for example, the communication device 900 may share characteristics with the mobile communication devices 405 and MCD1 illustrated in FIGS. 4-5 and discussed previously. Additionally for example, the communication device 900 (or components or modules thereof) may share any or all functional characteristics with the exemplary methods 600, 700 and 800 illustrated in FIGS. 6-8 and discussed previously. Note that the exemplary communication device 900 may perform various aspects of the present invention in hardware and/or software.

The exemplary communication device 900 may comprise a wireless 905 and/or wired 906 front end, which may operate to communicate through any of a wide variety of communication media. The exemplary communication device 900 may also comprise a variety of communication interface modules 910, which may operate to communicate with any of a wide variety of communication networks utilizing any of a wide variety of communication protocols, some of which are specified in the illustration at item 910.

The exemplary communication device 900 may also comprise a variety of signal processing modules (e.g., hardware and/or software modules) that operate to perform a variety of signal processing functions, non-limiting examples of which were provided previously in the discussion of FIGS. 6-8. Additionally, the exemplary communication device 900 may comprise a processor 960 (e.g., a baseband processor, general microprocessor, digital signal processor, etc.) that operates to execution software or firmware instructions (e.g., applications and/or subroutines) stored in a memory 950 (on-board the processor 960 or separate from the processor 960). Such a processor 960 may thus perform any of the functionality discussed previously.

The exemplary communication device 900 may further comprise any of a variety of user interface modules 940. Such user interface modules 940 may operate to assist with providing communication services to a user and/or to communicate general input and output information with a user of the communication device 900.

In summary, various aspects of the present invention provide a system and method for performing efficient network hand-off utilizing beam-forming information. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A mobile communication device comprising:
    a communication system configurable for radio communication with one or more remote radios, the communication system including beamforming circuitry responsive to stored beamforming information to develop one or more directed transmission beams in particular directions corresponding to the one or more remote radios;
    a location determining device configured to determine location information defining current location of the mobile communication device;
    a processor in data communication with the communication system and the location determining device, the processor configured to receive from the location determining device the location information defining the current location of the mobile communication device and to retrieve stored beamforming information associated with the current location of the mobile communication device and to provide the retrieved beamforming information to the communication system for development of one or more respective directed transmission beams in particular directions corresponding to one or more respective remote radios providing radio coverage to locations including the current location of the mobile communication device; and
    the processor further configured to retrieve the stored beamforming information for a communication handoff between a first remote radio and a second remote radio of the one or more radios, including first beamforming information for forming a first directed transmission beam in a particular direction corresponding to the first remote radio at the current location of the mobile communication device and second beamforming information for forming a second directed transmission beam in a particular direction corresponding to the second remote radio at the current location of the mobile communication device.

2. The mobile communication device of claim 1 further comprising:
    a memory in data communication with the processor and configured to store the beamforming information.

3. The mobile communication device of claim 2 wherein the processor is further configured to store the beamforming information in the memory indexed by location, respective locations for respective stored beamforming information being defined by the location information of the mobile communication device.

4. The mobile communication device of claim 2 wherein the processor is further configured to store the beamforming information in the memory indexed by a network identifier associated with a remote radio corresponding to a directed transmission beam to be formed by the beamforming circuitry.

5. The mobile communication device of claim 1 wherein the processor is configured to retrieve the stored beamforming information from a remote location by communicating the stored beamforming information with a remote radio of the one or more remote radios through the communication system.

6. The mobile communication device of claim 1 wherein the processor is configured to adapt the stored beamforming information over time and to store the adapted beamforming information for subsequent use at the current location of the mobile communication device.

7. The mobile communication device of claim 6 wherein the processor is configured to identify a changed communication environment and make adjustments to the stored beamforming information to accommodate the changed communication environment to form the adapted beamforming information.

8. The mobile communication device of claim 1 wherein the processor is configured to calculate beamforming parameters using the retrieved beamforming information as a function of the received current location of the mobile communication device and further configured to provide the calculated beamforming parameters to the communication system for development of the one or more respective directed transmission beams.

9. The mobile communication device of claim 8 wherein the processor is configured to calculate the beamforming parameters as a combination of the retrieved beamforming information and calculated adjustments to the retrieved beamforming information.

10. A method comprising:
at a communication device,
determining current location information for one of the communication device and a remote communication device, the current location information defining a current location of the one of the communication device and the remote communication device;
using the current location information to access stored data defining beamforming information associated with the current location of the communication device or the remote communication device;
using the stored data defining beamforming information, forming one or more directed transmission beams in particular directions corresponding to one or more respective remote radios for radio communication at the current location with the one or more respective remote radios;
communicating over the one or more directed transmission beams with the one or more respective remote radios; and
retrieving the stored data defining beamforming information for a communication handoff between a first remote radio and a second remote radio of the one or more radios, including first data defining beamforming information for forming a first directed transmission beam in a particular direction corresponding to the first remote radio at the current location of the communication device and second data defining beamforming information for forming a second directed transmission beam in a particular direction corresponding to the second remote radio at the current location of the communication device.

11. The method of claim 10 further comprising:
at the communication device,
determining that the stored data defining beamforming information should be modified;
modifying the stored data defining beamforming information; and
storing the modified data defining beamforming information for subsequent use.

12. The method of claim 10 further comprising:
at a wireless access point forming the communication device,
determining the current location information for a mobile communication device in current radio communication with the wireless access point;
using the current location information as an index, retrieving from memory the stored data defining beamforming information associated with the current location of the mobile communication device; and
using the stored data defining beamforming information, forming one or more directed transmission beams in particular directions toward the current location of the mobile communication device.

13. The method of claim 12 wherein retrieving from memory the stored data defining beamforming information comprises retrieving from a memory of the wireless access point the stored data defining beamforming information.

14. The method of claim 12 wherein retrieving from memory the stored data defining beamforming information comprises:
accessing, by the wireless access point, a central repository of data over a network; and
retrieving from the central repository the stored data defining beamforming information.

15. The method of claim 12 further comprising:
at the wireless access point,
using the current location information for the mobile communication device as an index, retrieving from memory stored data defining mobile device beamforming information associated with the current location of the mobile communication device and useable by the mobile communication device to form one or more directed transmission beams in particular directions corresponding to one or more respective remote radios; and
communicating the retrieved data defining mobile device beamforming information to the mobile communication device.

16. The method of claim 15 wherein retrieving from memory stored data defining mobile device beamforming information associated with the current location of the mobile communication device comprises
retrieving data defining beamforming information for forming a first directed transmission beam between the mobile communication device at the current location of the mobile communication and the wireless access point; and
retrieving data defining beamforming information for forming a second directed transmission beam between the mobile communication device at the current location of the mobile communication device and a handoff wireless access point, the handoff wireless communication device identified as being suitable for handing off network communication from the wireless access point to the handoff wireless access point.

17. A method comprising:
at a mobile communication device,
receiving location information defining current location of the mobile communication device;
using the received location information to retrieve beamforming information suitable for forming one or more directed transmission beams in particular directions corresponding to one or more respective remote radios for radio communication at the current location with the one or more respective remote radios;
using the retrieved beamforming information, forming the one or more directed transmission beams;

initiating communication with the one or more respective radios using the one or more directed transmission beam; and retrieving beamforming information for a communication handoff between a first remote radio and a second remote radio of the one or more radios, including first beamforming information for forming a first directed transmission beam in a particular direction corresponding to the first remote radio at the current location of the mobile communication device and second beamforming information for forming a second directed transmission beam in a particular direction corresponding to the second remote radio at the current location of the mobile communication device.

18. The method of claim 17 further comprising:
at the mobile communication device,
identifying a change in environment;
determining that the beamforming information should be modified to accommodate the change in environment;
modifying the beamforming information; and
storing the modified beamforming information for subsequent use.

19. The method of claim 17 further comprising:
at the mobile communication device,
using the retrieved beamforming information, calculating beamforming parameters as a function of the current location of the mobile communication device;
forming the one or more directed transmission beams for communication at the current location of the mobile communication device between the mobile communication device and a first remote radio and a second remote radio;
completing handoff of communication from the first remote radio to the second remote radio; and
terminating communication with the first remote radio.

* * * * *